United States Patent [19]
Van Melle

[11] 4,183,691
[45] Jan. 15, 1980

[54] LOCKING ELEMENT

[75] Inventor: Leonard Van Melle, Emst, Netherlands

[73] Assignee: Industries - En Handelsonderneming Bijstede B.V., Nunspeet, Netherlands

[21] Appl. No.: 895,486

[22] Filed: Apr. 11, 1978

[51] Int. Cl.² ............................................. F16B 21/14
[52] U.S. Cl. ................................... 403/109; 403/108; 403/324; 403/378; 85/813
[58] Field of Search ............... 403/328, 324, 379, 378, 403/108, 109; 285/303, 317, 318, 404; 85/8.1, 8.3, 5 CP

[56] References Cited

U.S. PATENT DOCUMENTS

| | | | |
|---|---|---|---|
| 2,138,843 | 12/1938 | Dupuis | 403/378 X |
| 2,655,391 | 10/1953 | Atkins | 285/404 X |
| 3,656,494 | 4/1972 | Cornett et al. | 285/303 X |
| 3,695,140 | 10/1972 | Noble | 85/8.3 |
| 3,980,805 | 9/1976 | Lipari | 403/378 X |

*Primary Examiner*—Andrew V. Kundrat

[57] ABSTRACT

A locking element for securing two interfitting or cylindrical members or tubes together comprising a helical or curved flat spring having an elongated recess at one end thereof and an inwardly turned pin adjacent the other end thereof, each of said cylindrical members having an aperture therein, said apertures adapted to be aligned and said pin adapted to be inserted through said recess and aligned apertures, the spring member compressively locking the interfitted members securely together, said spring element being secured in compressive engagement with the outermost cylindrical member when the pin is removed from the locking engagement with the interfitted members.

1 Claim, 3 Drawing Figures

LOCKING ELEMENT

The invention relates to a locking element for securing two interfitting cylindrical or tubular portions together into which each portion provided with an aperture in its circumference together into which a pin carried by a pre-biased resilient element connected therewith is inserted, said resilient element when, put into place, enclosing said portions at least partially.

Certain locking elements of said type are known. One of the drawbacks thereto is that said element, although providing a sufficiently secure lock may easily get lost which has been found to happen in actual practice.

It is an object of the invention to provide a locking element of the above mentioned type which, when not pinned to the interfitting portions, still remains clamped to the outermost of the portions to be interconnected. According to the invention, this object is achieved by providing a resilient element, which is of such a extended length proceeding forwardly of its pin mounting that, when the pin is withdrawn from the aligned apertures, it rests with its free end on the outer wall of the outer-most portion and the resilient element encloses the outermost portion over a sufficient distance so as to prevent the locking element from becoming accidentally detached therefrom.

The locking element according to the invention can, when not used for locking the interfitting portions together, be withdrawn from the aperture in the outermost cylindric element and displaced sufficiently so that the free end of the pin will rest on the outer wall of the outer of the interfitted cylindric portions. Since the resilient element then still encloses the outermost cylindric portion over a substantial distance, the locking element will not be detached but remains clamped around the cylindric portion and loss thereof is prevented. It is now possible, prior to mounting a number of cylindric portions, to arrange a locking element upon the portion which will be the outermost fitted portion, and thereafter the same can be fastened to the inner portions which speeds up considerably the erection of, for instance, a scaffold of inserted tubes.

A preferred embodiment is disclosed in which the resilient element is formed of a flat strip having a pin mounted at one end thereof and at the free end thereof, a recess of which the dimension in transverse direction is at least equal to the diameter of the pin.

The invention will be explained with reference to the drawing.

Figure 1:
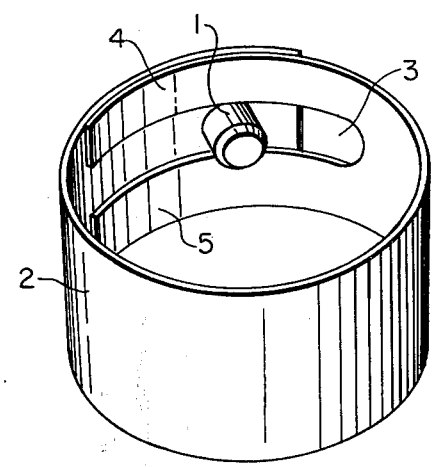
FIG. 1 is a perspective illustration of a locking element according to the invention.

The locking element shown in FIG. 1 comprises a security pin 1 which is fastened or otherwise secured to the one end of a curved plate spring 2 in the other end of which there is formed a groove 3 having a width such that the pin fits therein. The groove 3 is bounded by the lip 4 and 5.

The plate spring 2 is pre-biased in such a manner that it tends to "wind up" itself and is of such size and shape that it will always fit matchingly around an outermost tube which the locking element is disposed.

Figure 2:
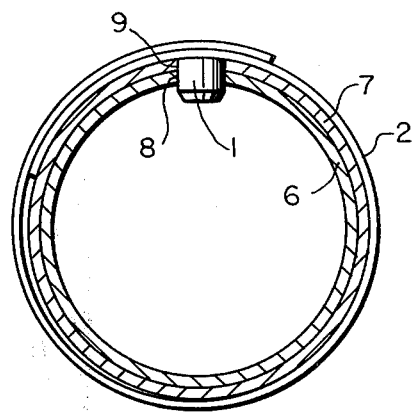
FIG. 2 is a cross section of a locking element arranged around two tubes inserted into each other, in the position in which the tubes are secured against distortion.

FIG. 2 is a cross section of two interfitting cylinder portions or telescoped tubes 6 and 7 respectively which by means of the locking element according to the invention, are secured against distortion and slipping relative to each other. In each of the tubes there is a round aperture 8 and 9 respectively adapted to be aligned through which the pin 1 is adapted to be projected; due to its own pre-bias the plate spring 2 is positioned without much clearance against the outer surface of the tube 7 and the pin 1 when projected through the cannot disengage itself from the apertures 8 and 9.

Figure 3:
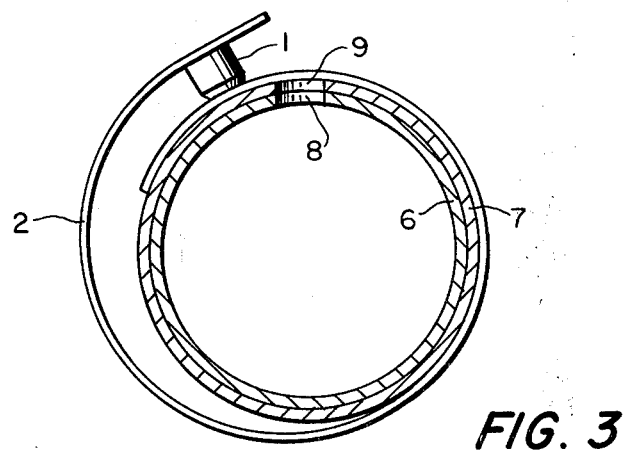
FIG. 3 is a cross section corresponding to FIG. 2, in the position in which the tubes can be detached from each other.

If it is desired to detach the pin from the telescoped tubes etc., it is sufficient to grip the end of the plate spring 2 located near the pin 1, to withdraw the pin 1 out of the apertures 8, 9 and displace it over a short distance on the outermost tube whereafter, as shown in FIG. 3, its end can bear on the outer surface of the outer tube 7. As a result of the tension of the plate spring 2, the pin 1 will then remain clamped around the outer tube 7 and cannot get lost therefore.

In identical manner, a locking element according to the invention may be arranged, also prior to the erection of, for instance, a scaffold of a number of interfitting tubes, in the vicinity of each of the points where the tubes should be fixed to each other; it is then only necessary to displace the locking element to such an extent that the pin thereof falls into the holes located in line to fasten the tubes together.

I claim:

1. A locking element for securing two interfitting cylindric portions against shifting, each said portion being provided with an aperture in the circumference, said locking element comprising a pin with a pre-biased resilient element connected therewith which, when said pin is disposed within the said apertures, encloses the two cylindric portions at least partially, the resilient element having such a length that, when the pin is withdrawn from the said apertures, the free end of the resilient element rests on the outer wall of the outermost cylindric portion enclosing said outermost portion over a sufficient distance, so as to prevent the locking element from being detached unintentionally, and said resilient element is a curved flat plate spring having an elongated recess in its free end, the width of said recess being at least equal to the diameter of the pin.

* * * * *